(12) United States Patent
Nordlin

(10) Patent No.: US 7,112,016 B2
(45) Date of Patent: Sep. 26, 2006

(54) UNIVERSAL QUICK CHANGE HOLE SAW ARBOR

(75) Inventor: William F. Nordlin, Poplar Grove, IL (US)

(73) Assignee: Greenlee Textron Inc., Rockford, IL (US)

( * ) Notice: Subject to any disclaimer, the term of this patent is extended or adjusted under 35 U.S.C. 154(b) by 139 days.

(21) Appl. No.: 10/773,746

(22) Filed: Feb. 6, 2004

(65) Prior Publication Data

US 2004/0161313 A1   Aug. 19, 2004

Related U.S. Application Data

(60) Provisional application No. 60/448,387, filed on Feb. 18, 2003.

(51) Int. Cl.
*B23B 51/04* (2006.01)

(52) U.S. Cl. .................................. 408/204; 408/239 R

(58) Field of Classification Search .............. 408/204, 408/206, 238, 239 R, 240; 279/75
See application file for complete search history.

(56) References Cited

U.S. PATENT DOCUMENTS

| | | | | |
|---|---|---|---|---|
| 3,138,183 A | * | 6/1964 | Stewart | 408/206 |
| 3,647,310 A | * | 3/1972 | Morse | 408/239 R |
| 3,854,840 A | | 12/1974 | Miyanaga | |
| 3,973,862 A | | 8/1976 | Segal | |
| 4,171,821 A | * | 10/1979 | Miller | 279/75 |
| 4,551,045 A | * | 11/1985 | Bossler | 408/206 |
| 5,035,550 A | * | 7/1991 | Ajimi | 408/204 |
| 5,577,743 A | * | 11/1996 | Kanaan et al. | 279/72 |
| 5,624,213 A | * | 4/1997 | Anderson | 408/206 |
| 5,988,957 A | * | 11/1999 | Wheeler | 408/239 R |
| 6,176,654 B1 | * | 1/2001 | Jore | 408/239 R |
| 6,341,925 B1 | * | 1/2002 | Despres | 408/204 |
| 6,375,396 B1 | | 4/2002 | Fangmann et al. | |
| 6,623,220 B1 | * | 9/2003 | Nuss et al. | 408/204 |
| 2005/0025592 A1 | * | 2/2005 | Cantlon | 408/204 |

FOREIGN PATENT DOCUMENTS

| | | | |
|---|---|---|---|
| DE | 201 13 578 U1 | | 10/2001 |
| EP | 1 066 902 A2 | | 1/2001 |
| EP | 1 193 014 A1 | | 4/2002 |
| JP | 56-89414 | | 7/1981 |
| JP | 64-058409 A | * | 6/1989 |
| JP | 2001-162422 | * | 6/2001 |
| JP | 2002-137111 | * | 5/2002 |
| JP | 2002-355712 | * | 12/2002 |
| JP | 2004-268166 | * | 9/2004 |
| TW | 483354 | | 4/2002 |
| WO | 03/024677 | * | 3/2003 |
| WO | 2004/085104 | * | 10/2004 |

* cited by examiner

*Primary Examiner*—Daniel W. Howell
(74) *Attorney, Agent, or Firm*—Trexler, Bushnell, Giangiorgi, Blackstone & Marr, Ltd.

(57) ABSTRACT

An arbor assembly includes a shank mounted to the chuck of an electric drill, an adaptor which supports a hole saw mounted to the shank, and a sleeve for locking and unlocking the adaptor and the shank. Rotational forces from the drill are transferred to the adaptor to rotate the hole saw. The sleeve slides along the outer surface of the shank and allows a user to quickly change the hole saw. With the sleeve in the unlocked position, the adaptor easily slides out of the shank, a new adaptor is inserted into the shank, and the sleeve is then placed in the locked position prior to rotation of the drill.

23 Claims, 7 Drawing Sheets

UNIVERSAL QUICK CHANGE HOLE SAW ARBOR

RELATED APPLICATION

This application claims the benefit of U.S. provisional patent application Ser. No. 60/448,387 filed on Feb. 18, 2003 and entitled Universal Quick Change Hole Saw Arbor.

BACKGROUND OF THE INVENTION

This invention relates to an arbor assembly which allows a hole saw to be quickly mounted and dismounted from an electric drill. Hole saws are commonly used in connection with electric drills to create holes in work pieces. It is often necessary to create holes of varying sizes and therefore is convenient to be able to quickly mount and dismount hole saws of different sizes to and from an electric drill.

OBJECTS AND SUMMARY OF THE INVENTION

A general object of the present invention is to provide an arbor assembly which allows for easy mounting of a hole saw to an electric drill and dismounting of the hole saw from an electric drill.

Another object of the present invention is to provide an arbor assembly which allows the hole saw to be mounted and dismounted from the arbor assembly without removing the pilot drill bit.

Yet another object of the present invention is to reduce vibration of the arbor assembly and the hole saw when in use.

Still another object of the present invention is to allow for easy replacement of the hole saw when the hole saw becomes worn.

A further object of the present invention is to provide an arbor assembly which allows for easy removal of a slug from the hole saw.

Yet a further object of the present invention is to allow for greater visibility upon drilling of a pilot hole.

Still a further object of the present invention is to eliminate the tendency of the hole saw to crash into the workpiece upon drilling of the pilot hole.

Briefly, and in accordance with the foregoing, the present invention provides an arbor assembly including a shank, a sleeve and an adaptor. The sleeve of the arbor assembly is mounted over a portion of the shank. The shank is mounted within the chuck of an electric drill to provide rotation to the arbor assembly. A hole saw is mounted to the adaptor of the arbor assembly. The adaptor and hole saw are easily mounted to the remainder of the arbor assembly by inserting a portion of the adaptor within a passageway of the shank. By moving the sleeve distally, steel balls are forced into engagement with the adaptor to lock the adaptor within the remainder of the arbor assembly.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 2b is a top plan view of the shank of FIG. 2a;

FIG. 2d is a left elevational view of the shank of FIG. 2a;

FIG. 2e is a right elevational view of the shank of FIG. 2a;

FIG. 4b is a cross sectional view of the sleeve of the FIG. 4a;

FIG. 7b is a cross-sectional view of the adaptor of FIG. 7a;

FIG. 7c is a left elevational view of the adaptor of FIG. 7a;

FIG. 7d is a right elevational view of the adaptor of FIG. 7a;

FIG. 9b is a right elevational view of the bushing of FIG. 9a.

DETAILED DESCRIPTION OF THE ILLUSTRATED EMBODIMENTS

Figure 1:
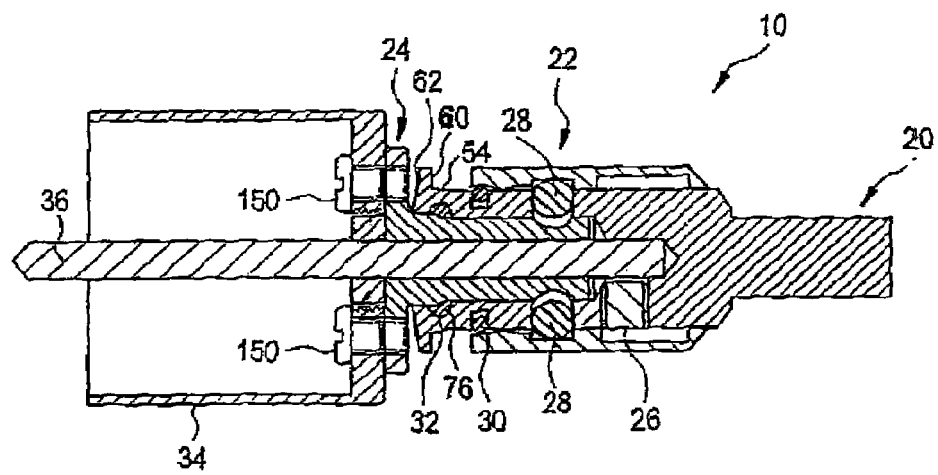
FIG. 1 is a cross sectional view of a first embodiment of an arbor assembly in an unlocked position with a hole saw and a pilot drill bit mounted to the arbor assembly.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

In describing the invention, use of the word "proximal" shall refer to elements, surfaces or positions closest to a user of the present invention and "distal" shall refer to elements, surfaces or positions furthest from a user of the present invention.

An arbor assembly 10, 200 allows for the quick mounting and dismounting of a hole saw to and from the arbor assembly 10, 200. The quick mounting and dismounting allows for easy use of varying sized hole saws and also allows for the slug which has been cut by the hole saw to be easily ejected from the hole saw.

Figure 5:
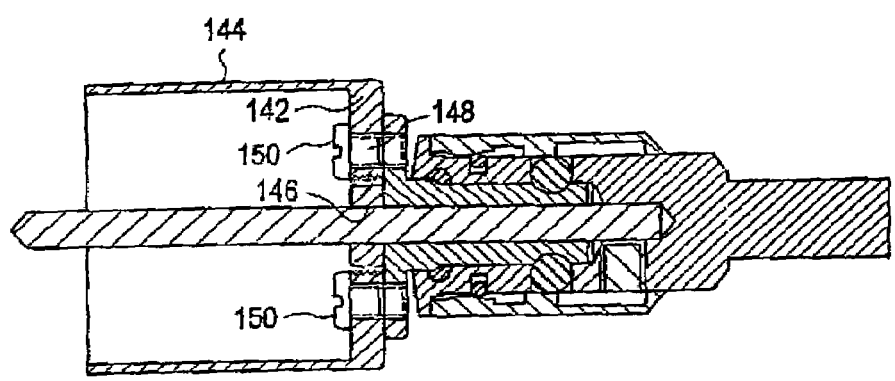
FIG. 5 is a cross-sectional view of the arbor assembly of FIG. 1 in a locked position with a hole saw and pilot drill bit mounted to the arbor assembly.
Figure 2A:
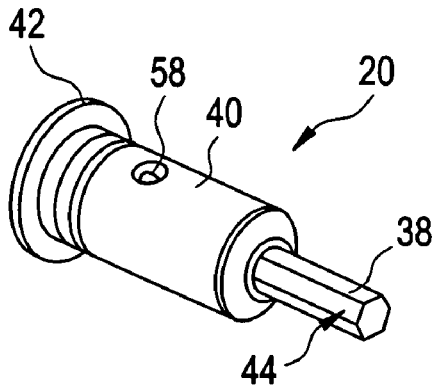
FIG. 2a is a perspective view of a shank of the arbor assembly of FIG. 1.
Figure 2C:
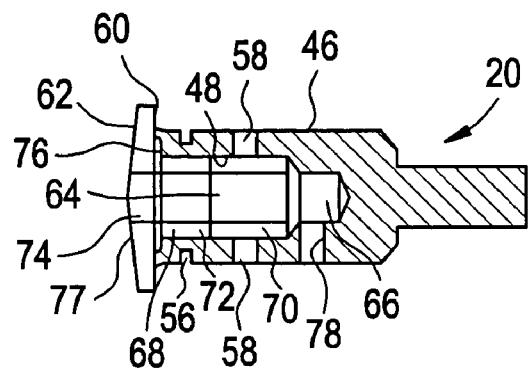
FIG. 2c is a cross-sectional view of the shank along line 2c—2c of FIG. 2b.
Figure 2B:
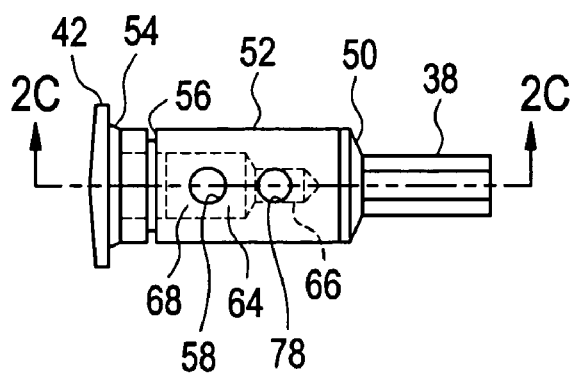
Figure 2D:
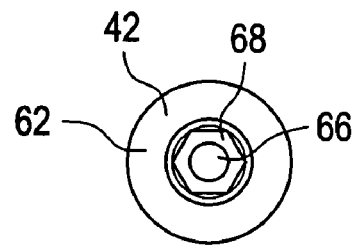
Figure 2E:
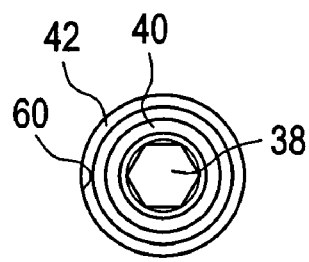
Figure 6:
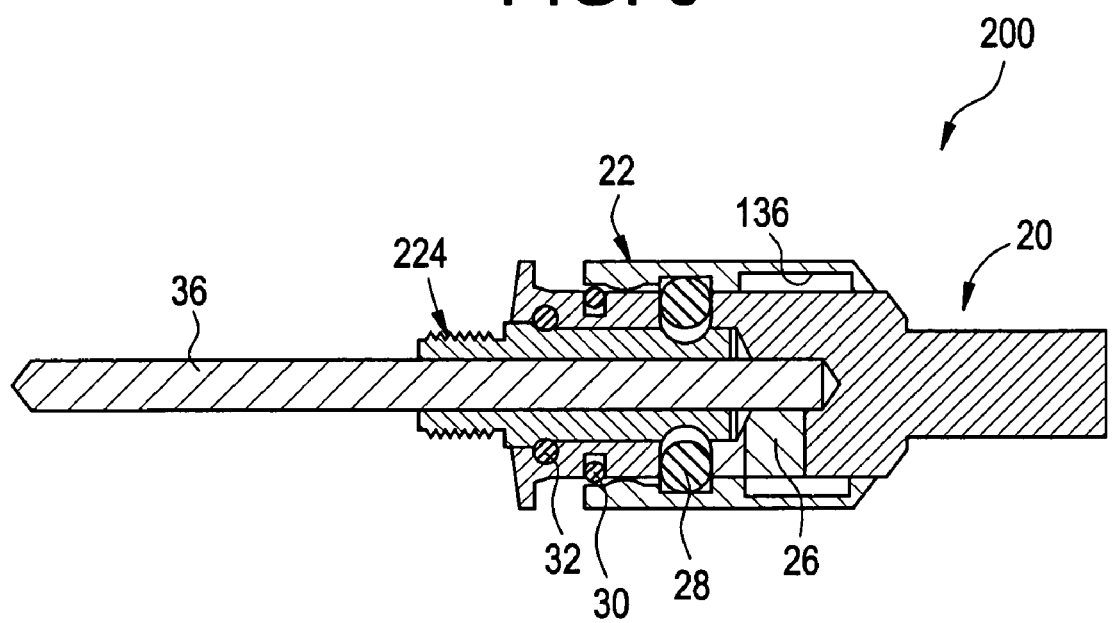
FIG. 6 is a cross-sectional view of a second embodiment of the arbor assembly in an unlocked position with a pilot drill bit mounted to the arbor assembly.
Figure 8:
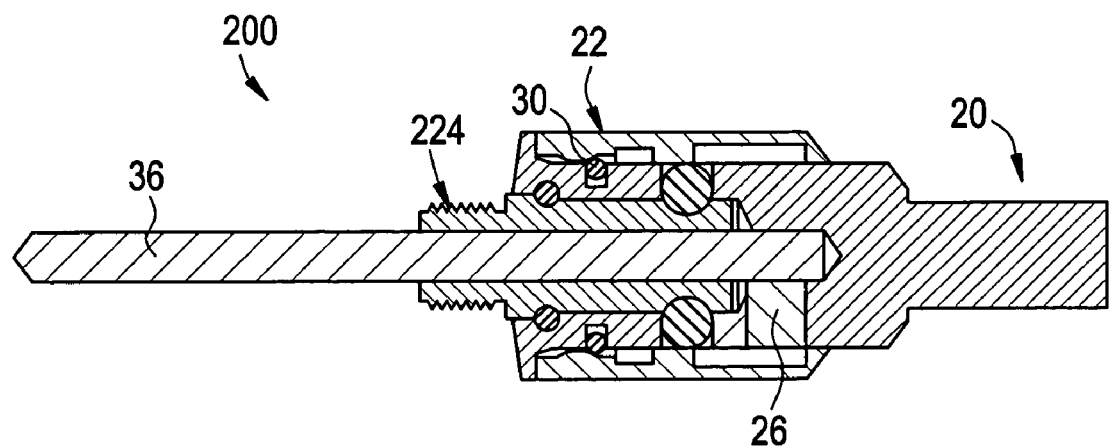
FIG. 8 is a cross-sectional view of the arbor assembly of FIG. 6 in the locked position with a pilot drill bit mounted to the arbor assembly.
Figure 7A:
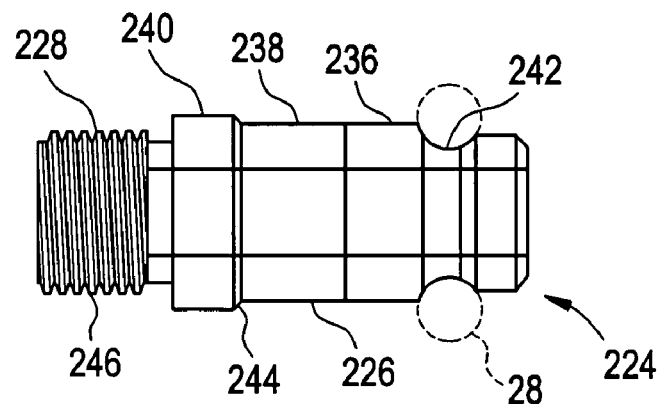
FIG. 7a is a front elevational view of the adaptor of the arbor assembly of FIG. 6 and steel balls.
Figure 7B:
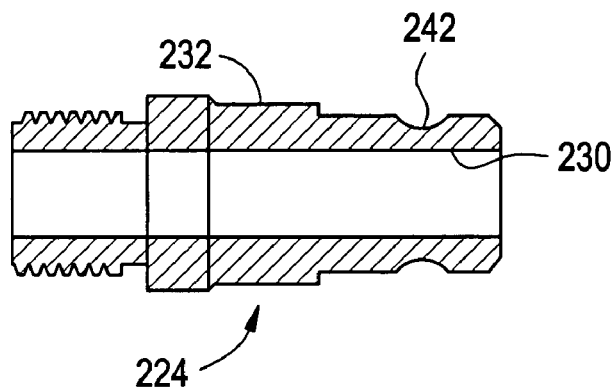
Figure 7C:
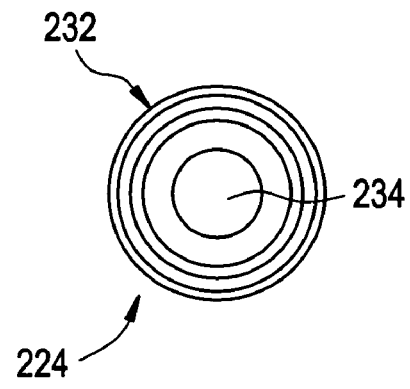
Figure 7D:
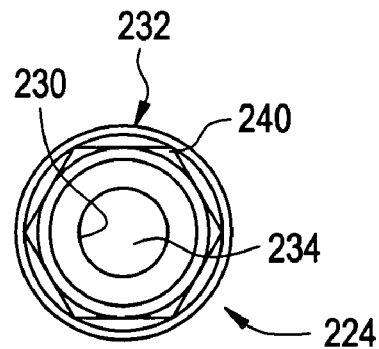
Figure 9A:
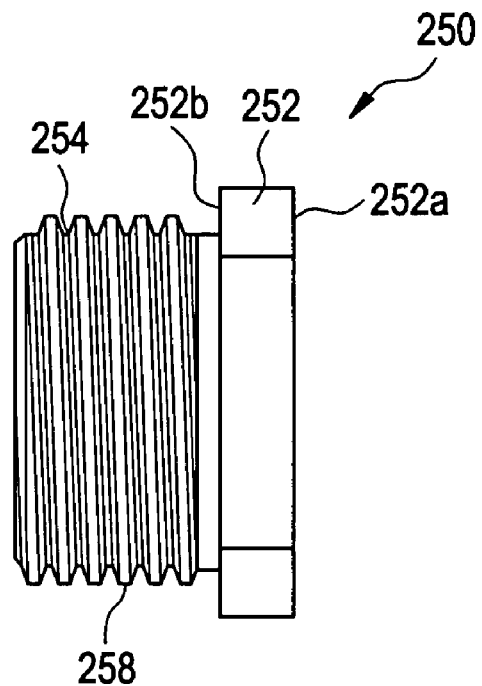
FIG. 9a is a front elevational view of a bushing for use in connection with the arbor assembly of FIG. 6.
Figure 9B:
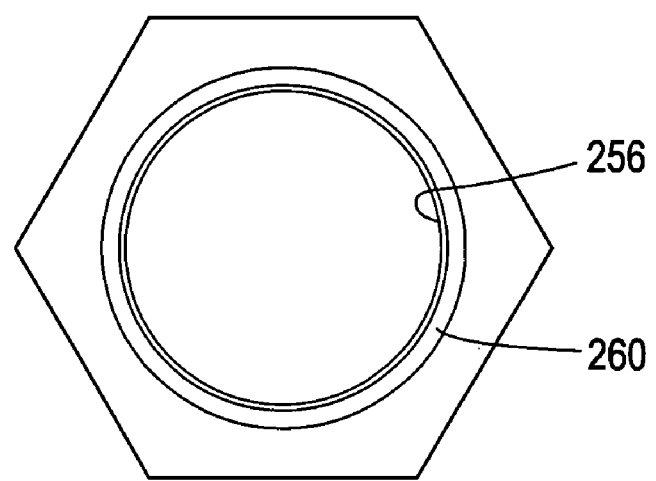

A first embodiment of the arbor assembly 10 is shown in FIGS. 1–5 and a second embodiment of the arbor assembly 200 is shown in FIGS. 6–8. A bushing 250 for use with the second embodiment of the arbor assembly 200 is shown in FIGS. 9a–9b.

Attention is invited to the first embodiment of the arbor assembly 10 shown in FIGS. 1–5. The arbor assembly 10 generally includes a shank 20, a sleeve 22, an adaptor 24, a set screw 26, steel balls 28, a steel C-ring 30 and an O-ring 32. The arbor assembly 10 is shown in its unlocked/open position in FIG. 1. A hole saw 34 and a pilot drill bit 36 are mounted to the arbor assembly 10.

The shank 20 is best shown in FIGS. 2a–2e. The shank 20 is preferably made from metal, such as steel. The shank 20 generally includes an elongated gripping portion 38, an intermediate portion 40 and a flange portion 42. The gripping portion 38 extends from the proximal end of the shank 20 to the intermediate portion 40. The intermediate portion 40 extends from the gripping portion 38 to the flange portion 42. The gripping portion 38 of the shank 20 includes gripping surfaces to be received by the chuck (not shown) of an electric drill (not shown) to provide rotation to the arbor assembly 10. The intermediate portion 40 and the flange portion 42 receives the adaptor 24 as will be described herein.

The diameter of the intermediate portion 40 is larger than the diameter of the gripping portion 38. The intermediate portion 40 includes an outer wall 46 which will engage the sleeve 20 and an inner wall 48 which will engage the adaptor 24 as will be described herein.

The outer wall 46 includes a first portion 50, a second portion 52 and third portion 54. The first portion 50 of the outer wall 46 is generally angled and joins the gripping portion 38 to the intermediate portion 40. The second portion 52 of the outer wall is generally cylindrical. The third portion 54 is angled relative to the second portion 52 and joins the intermediate portion 40 to the flange 42. Preferably the angle between the second portion 52 and the third portion 54 is approximately 15 degrees. The outer wall 46 of the intermediate portion 40 includes a C-ring recess 56 which houses the C-ring 30 for engagement with the sleeve 22 as will be described herein. The C-ring recess is spaced from the distal end of the intermediate portion 40. Two diametrically opposed ball passageways 58 extend from the outer wall 46 to the inner wall 48. The ball passageways 58 are positioned proximally of the C-ring recess 56.

The diameter of the flange portion 42 is larger than the diameter of the intermediate portion 40. The flange portion 42 includes a proximal wall 60 and a distal wall 62. The proximal wall 60 extends outwardly from the third portion 54 of the outer wall 46 of the intermediate portion 40. The proximal wall 60 is generally perpendicular to the axial center line of the shank 20. The distal wall 62 forms the distal end of the shank 20. The distal wall 62 is preferably angled approximately 80° relative to the axial center line of the shank 20 as best illustrated in FIG. 1.

A shank passageway 64 is defined by the inner wall 48 and extends from the distal end of the shank 20, through the flange portion 42 of the shank 20 and into the intermediate portion 40 of the shank 20. The shank passageway 64 includes a pilot portion 66 and an adaptor portion 68.

The pilot portion 66 of the shank passageway 64 is generally cylindrical and is located within the intermediate portion 40 of the shank 20. The pilot portion 66 of the shank passageway 64 receives the pilot drill bit 36 as will be described herein.

The adaptor portion 68 of the shank passageway 64 extends through the flange portion 42 of the shank 20, into the intermediate portion 40 of the shank 20 and to the pilot portion 66 of the shank passageway 64. The diameter of the adaptor portion 68 of the shank passageway 64 is larger than the diameter of the pilot portion 66 of the shank passageway 64. The adaptor portion 68 of the shank passageway 64 is in fluid communication with the diametrically opposed ball passageways 58.

The adaptor portion 68 of the shank passageway 64 includes a first section 70, a second section 72 and a third section 74. The first section 70 is generally cylindrical and extends from the pilot portion 66 of the shank passageway 64 to the second section 72 of the adaptor portion 68 of the shank passageway 64. The first section 70 extends proximally and distally of the ball passageways 58. The second section 72 of the adaptor portion 68 of the shank passageway 64 is hexagonally-shaped and extends from the first section 70 to the third section 74. The second section 72 of the adaptor portion 68 extends proximally and distally of the C-ring recess 56. The third section 74 of the adaptor portion 68 of the shank passageway 64 is cylindrically-shaped and extends from the second section 72 to the distal end of the shank 20. The diameter of the third section 74 of the adaptor portion 68 of the shank passageway 64 is larger than the diameter of the second section 72 of the adaptor portion 68 of the shank passageway 64. A shank shoulder 76 is provided where the second section 72 and third section 74 of the adaptor portion 68 of the shank passageway 64 meet. The third section 74 also includes an O-ring recess 77 where the second section 72 and the third section 74 of the adaptor portion 68 of the shank passageway 64 meet.

A set screw passageway 78 is provided within the intermediate portion 40 of the shank 20. The set screw passageway 78 is located proximally of the ball passageways 58. The set screw passageway 78 extends from the outer wall 46 of the shank 20 to the pilot portion 66 of the shank passageway 64. The set screw passageway 78 is generally perpendicular to the shank passageway 64. Threads are provided along the wall of the set screw passageway 78 for engaging a set screw 26 (see FIG. 1) as will be described herein.

Figure 3A:
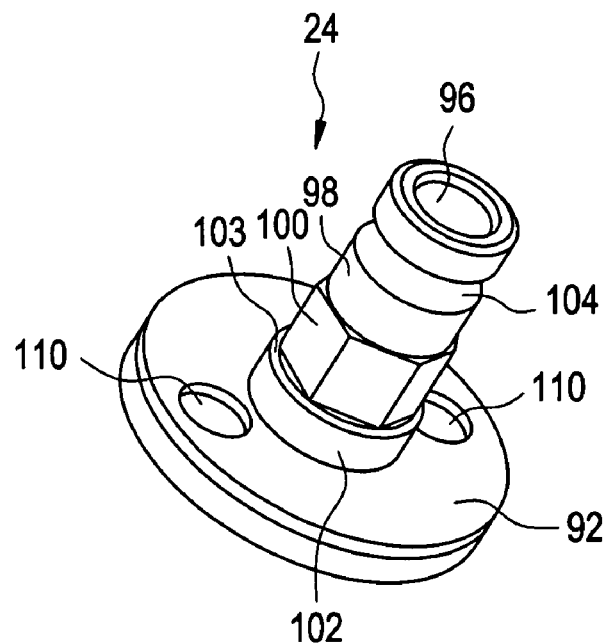
FIG. 3a is a perspective view of an adaptor of the arbor assembly of FIG. 1.
Figure 3B:
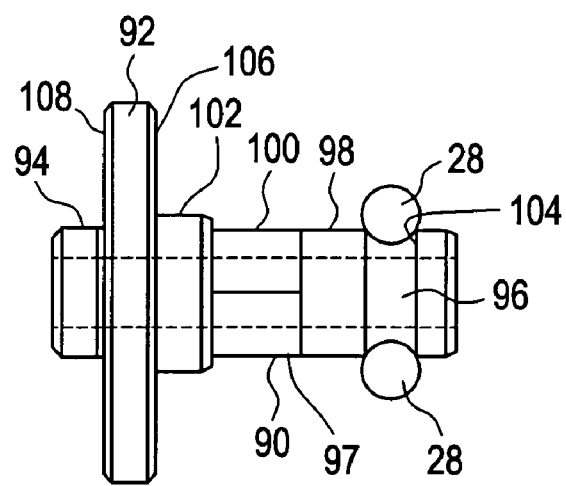
FIG. 3b is a front elevational view of the adaptor of FIG. 3a and steel balls.
Figure 3C:
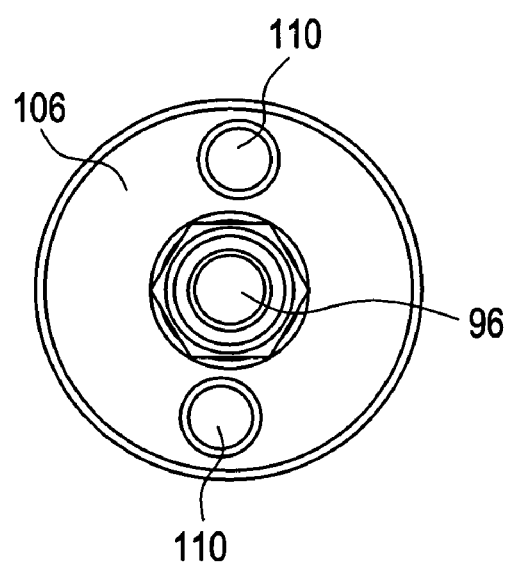
FIG. 3c is a right elevational view of the adaptor of FIG. 3b.

The adaptor 24 of the arbor assembly 10 is best shown in FIGS. 3a–3c. The adaptor 24 is preferably made from metal, such as, steel and generally includes a shaft 90, a flange 92 and a nose 94. The shaft 90 is generally cylindrically-shaped. The flange 92 is generally disc-shaped. The diameter of the flange 92 is larger than the diameter of the shaft 90. The nose 94 is also generally cylindrically-shaped. The diameter of the nose 94 is smaller than the diameter of the flange 92. A cylindrically-shaped adaptor passageway 96 extends through the adaptor 24.

The shaft 90 of the adaptor 24 has an outer wall 97 which includes a first portion 98, a second portion 100, and a third portion 102. The first portion 98 is located at the proximal end of the shaft 90 and is generally cylindrically-shaped. The first portion 98 extends distally from the proximal end to the second portion 100. A concave groove 104 is provided within the first portion 98 of the outer wall 97 to receive the steel balls 28 as will be described herein. The second portion 100 extends from the first portion 98 to the third portion 102. The second portion 100 is hexagonally-shaped. The third portion 102 extends from the second portion 100 to the flange 92. The third portion 102 of the outer wall 97 is generally cylindrically-shaped. An adaptor shoulder 103 is provided where the second portion 100 and the third portion 102 of the outer wall 97 meet.

The flange 92 includes a proximal wall 106 and a distal wall 108. Two diametrically opposed mounting apertures 110 are provided through the flange 92 of the adaptor 24 and extend from the distal wall 108 to the proximal wall 106 of the flange 92.

The nose 94 of the adaptor 24 is generally cylindrically-shaped. The nose 94 extends distally from the flange 92 and forms the distal end of the adaptor 24.

Figure 4A:
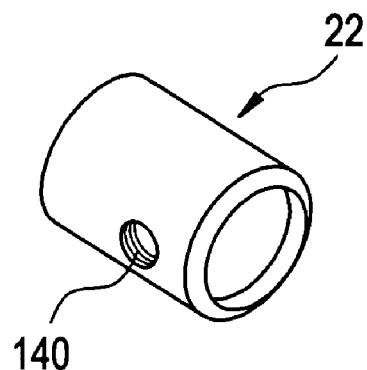
FIG. 4a is a perspective view of a sleeve of the arbor assembly of FIG. 1.
Figure 4B:
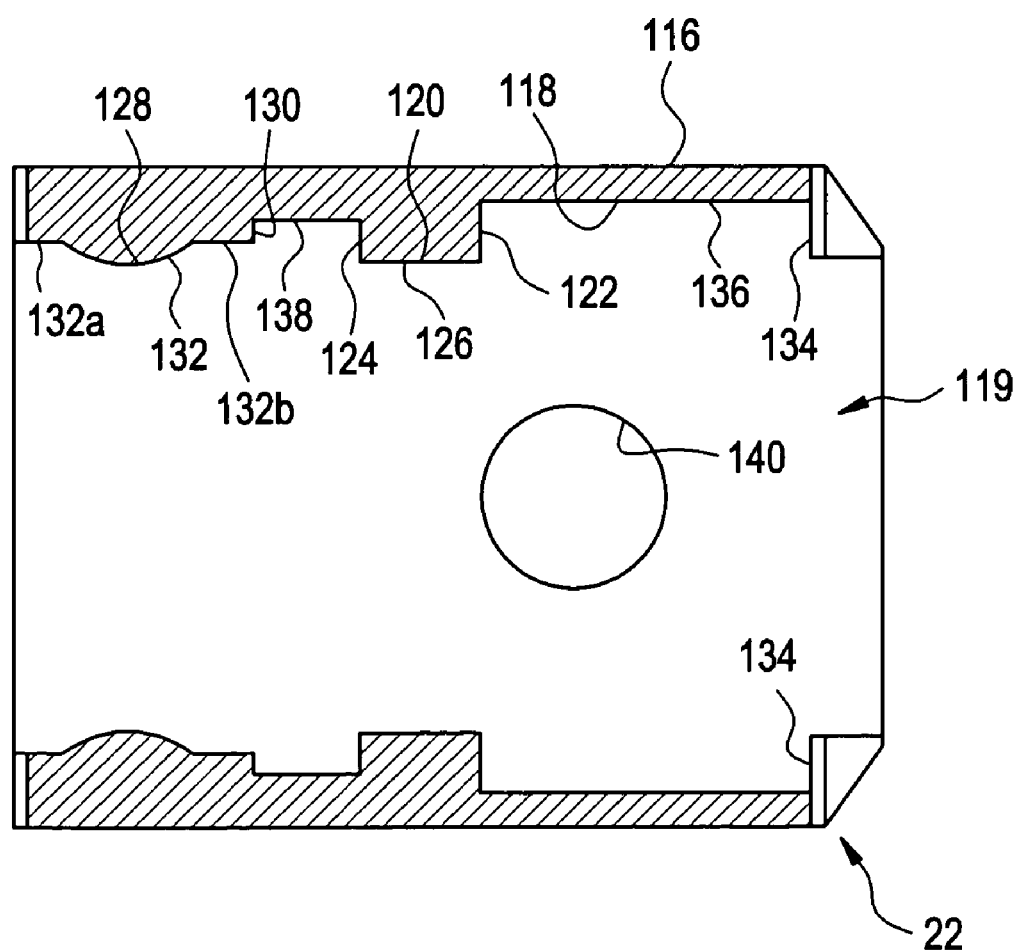

The sleeve 22 of the arbor assembly 10 is best shown in FIGS. 4a–4b. The sleeve 22 is generally tubularly-shaped and is preferably made from metal, such as, steel. The sleeve 22 includes an exterior surface 116 and an interior surface 118. A sleeve passageway 119 extends through the axial center of the sleeve 22 from the proximal end of the sleeve 22 to the distal end of the sleeve 22 and is defined by the interior surface 118.

A cylindrically-shaped ball protrusion 120 extends inwardly from the interior surface 118 around the interior circumference of the sleeve 22. The ball protrusion 120 is provided at approximately the midpoint of the sleeve 22. The ball protrusion 120 includes a proximal wall 122, a distal wall 124 and an interior wall 126.

A generally cylindrically-shaped locking protrusion 128 also extends inwardly from the interior surface 118 around the interior circumference of the of the sleeve 22. The locking protrusion 128 is proximate to the distal end of the sleeve 22. The locking protrusion 128 includes a proximal wall 130 and a convexly curved interior wall 132. A flat portion 132a extends distally from the curved interior wall 132 and a flat portion 132b extends distally from the curved interior wall 132.

An end wall 134 is provided proximate the proximal end of the sleeve 22 and extends around the interior circumference of the sleeve 22. A set screw recess 136 is provided between the end wall 134 and the proximal wall 122 of the ball protrusion 120. The set screw recess 136 extends around the interior circumference of the sleeve 22. The set screw recess 120 extends along the length of the sleeve for a distance greater than the diameter of the set screw passageway 78 of the shank 20.

A ball recess 138 is provided between the distal wall 124 of the ball protrusion 120 and the proximal wall 130 of the locking protrusion 128. The ball recess 138 extends along the length of the sleeve for a distance slightly greater than the diameter of the balls 28.

An access passageway 140 extends from the exterior wall 116 to the interior wall 118. The access passageway 140 provides access to the set screw 26 as will be described herein. The access passageway 140 is generally positioned toward the distal end of the set screw recess 136.

Assembly of the arbor assembly 10 begins by placing the C-ring 30 in the C-ring recess 56 of the shank 20. The O-ring 32 is placed in the O-ring recess 77. The pilot drill bit 36 is inserted into the shank 20 and the steel balls 28 are placed in the ball passageways 58 of the shank 20. Next, the distal end of the sleeve 22 is passed over the gripping portion 38 of the shank 20 and then over the intermediate portion 40 of the shank 20 until the distal end of the sleeve 22 passes over the C-ring 30. As the distal end of the sleeve 22 is passed over the shank 20, the interior wall 132 contacts the steel balls 128 and forces the steel balls 128 within the ball passageways 58 of the shank 20. When the distal end of the sleeve 22 has passed over the C-ring 30 the ball recess 138 of the sleeve 22 is generally aligned with the ball passageways 58 of the shank 20, as shown in FIG. 1, and the steel balls 28 are free to move into the ball recess 138 of the sleeve 22.

Next, the set screw 26 is passed through the access passageway 140 of the sleeve 22 and into the set screw passageway 78 of the shank 20 until it engages the pilot drill bit 36. The set screw 26, when mounted in the set screw passage way 78, provides a "stop" for the sleeve 22. The sleeve 22 can move proximally and distally along the shank 20 for a limited distance. Proximal movement of the sleeve 22 is limited by the contact between the set screw 26 and the proximal wall 122 of the ball protrusion 120 of the sleeve 22. Distal movement of the sleeve 22 is limited by the contact between the set screw 26 and the end wall 134 of the sleeve 22. In this manner, the set screw 26 prohibits the sleeve 22 from sliding off of the shank 20.

As shown in FIG. 5, the hole saw 34 to be used in connection with the arbor assembly includes a circular back plate 142 and a cylindrically shaped skirt 144 which depends from the back plate 142. An aperture 146 is provided through the back plate 142 of the hole saw 34 at its axial center. Two diametrically opposed mounting apertures 148 are also provided through the back plate 142 of the hole saw 34 and are spaced from the aperture 146.

The hole saw 34 is attached to the adaptor 24 of the arbor assembly 10 by passing the nose 94 of the adaptor 24 through the aperture 146 in the backplate 142 of the hole saw 34. Next, mounting screws 150 are passed through the mounting apertures 148 of the hole saw and then through the mounting passageways 110 of the adaptor 24. The mounting screws 150 are then used to secure the hole saw 34 to the adaptor 24.

The adaptor 24 is then mounted to the remainder of the arbor assembly 10. The pilot drill bit 36 is passed through the adaptor passageway 96 until the proximal wall of the flange 92 of the adaptor 24 is proximate the distal wall of the flange portion 42 of the shank 20. When the adaptor 24 is mounted within the shank 20, the second portion 100 of the shaft 90 of the adaptor 24 will rest within the second section 72 of the adaptor portion 68 of the shank passageway 64. Thus, the hexagonally shaped portion 100 of the shaft 90 will rest within the hexagonally shaped portion 72 of the shank passageway 64. When the adaptor 24 is properly aligned within the shank 20, the O-ring 32 is compressed between the shank shoulder 76 and the adaptor shoulder 103. Although the second portion 72 of the shank passageway 64 of the shank 20 and the portion 100 of the shaft 90 of the adaptor 24 are described as hexagonally-shaped, it is to be understood that the shaft 90 and the shank passageway 64 can be any one of a variety of shapes which allows the adaptor 24 to be positioned within the shank passageway 64 yet prevents rotation of the adaptor 24 relative to the shank 20.

The adaptor 24 is then locked with the shank 20 and sleeve 22 by sliding the sleeve 22 in the distal direction relative to the shank 20. As the sleeve 22 slides in the distal direction, the locking protrusion 128 of the sleeve 22 forces the C-ring 30 to compress into the C-ring recess 56 of the shank 20. At the same time, the ball protrusion 120 of the sleeve 22 forces the steel balls 28 into the ball passageways 58 of the shank 20. The user continues to slide the sleeve 22 forward until the locked position of the sleeve 22 is reached. When the sleeve 22 is in the locked position, the locking protrusion 128 of the sleeve 22 is positioned distally of the C-ring 30 and the C-ring 30 expands so that it contacts the flat portion 132a of the inner wall 118 of the sleeve 22 distally of the ball recess 138. Also, when the sleeve 22 is in the locked position, the ball protrusion 120 of the sleeve 22 is positioned radially outwardly of the ball passageways 58 of the shank 20. The ball protrusion 120 forces the balls 28 into the passageways 58 so that the balls 28 contact the concave groove 104 of the adaptor 24. As a result of the contact between the balls 28 and the adaptor 24, the adaptor 24 is fixed axially within the shank 20. The arbor assembly 10 is shown in FIG. 5 in its locked position.

In use, as the shank 20 is rotated by the drill, the pilot drill bit 36 is also rotated due to the retention of the pilot drill bit 36 within the pilot portion 66 of the shank passageway 64 by the set screw 26. The hexagonally-shaped second section 72 of the adaptor portion 68 of the shank passageway 64 transfers rotational force from the drill to the hexagonally-shaped second portion 100 of the adaptor shaft 90, and in turn to the hole saw 34. The O-ring 32 reduces vibrations as the hole saw 34 is rotated and advanced within the workpiece. As the hole saw 34 cuts the hole in the workpiece, a slug is formed and is generally retained within the skirt 144 of the hole saw.

If the user desires to use a different hole saw, perhaps one with a skirt with a different diameter, the user removes the adaptor 24 with the attached hole saw 34 in the following manner. The user slides the sleeve 22 in the proximal direction relative to the shank 20. As the sleeve 22 is pulled in the proximal direction, the locking protrusion 128 causes the C-ring 30 to compress. As the user continues to pull the sleeve 22 in the proximal direction, the ball protrusion 120 of the sleeve 22 moves proximally of the ball passageways 58 of the shank 20 and the ball recess 138 of the sleeve 22 is aligned with the ball passageways 58. At this point the sleeve 22 is in the unlocked position and the balls 28 can move into the ball recess 138 of the sleeve 22. As the balls 28 are no longer in engagement with the adaptor 24, the adaptor 24 can be removed from the shank 20 simply by pulling the adaptor 24 in the distal direction. As the adaptor 24 is pulled distally, the pilot drill 36 is stripped from the slug allowing the slug to be easily removed from the skirt 144 of the hole saw 34. A new hole saw mounted to another adaptor 24 can then be mounted within the shank 20 in the manner described above. Alternatively, the hole saw 34 can be removed from the adaptor 24 and the new hole saw can be mounted to the adaptor 24 and then mounted within the shank 20.

As can be seen from the above description, the pilot drill bit 36 is left in place while the hole saw 34 and the adaptor 24 are dismounted from the remainder of the arbor assembly 10. The user can remove the hole saw 34 to drill the pilot hole in the work piece, allowing the user greater visibility of the workpiece. Thus, the pilot hole can be more accurately located. In addition, by drilling the pilot hole without the hole saw 34 attached, the pilot hole can be drilled without concern of the hole saw 34 "crashing into" the workpiece. Once the pilot hole is drilled, the adaptor 24 and hole saw 34 can be mounted within the shank 20 and sleeve 22. The pilot drill bit 36 can then be passed through the pilot hole to align the hole saw 34 with the workpiece and the hole saw 34 can be placed close to the workpiece prior to activating the electric drill. Thus, the user has greater control over the hole saw 34 as it approaches the workpiece. The improved control over the hole saw 34 also reduces the possibility of bending the pilot drill bit 36 which sometimes occurs when a conventional hole saw "crashes into" the workpiece.

As also can be seen from the above description, the hole saw 34 can be easily removed from the adaptor 24. This allows the hole saw 34 to be replaced when it becomes dull and worn without also replacing the adaptor 24. Attention is now invited to the second embodiment of the arbor assembly shown in FIGS. 6–8. The arbor assembly 200 includes a shank 20, a sleeve 22, and an adaptor 224. The shank 20 and sleeve 22 are identical to the shank 20 and sleeve 22 of the first embodiment 10 of the arbor assembly 10 and therefore the specifics of same are not repeated herein. The adaptor 224 of the second embodiment is designed for use with smaller diameter hole saws.

The adaptor 224 is best shown in FIGS. 7a–7d. The adaptor 224 is generally cylindrically shaped and is preferably made from metal, such as, steel. The adaptor 224 includes a shaft 226 and a nose 228. The shaft 226 extends from the proximal end of the adaptor 224 to the nose 228. The nose 228 of the adaptor 224 extends from the shaft 226 to the distal end of the adaptor 224. The adaptor 224 includes an inner wall 230 and an outer wall 232. A cylindrically shaped adaptor passageway 234 is defined by the inner wall 230 and extends from the proximal end to the distal end of the adaptor 224.

The outer wall 232 of the adaptor 224 includes a first portion 236, a second portion 238, and a third portion 240. The first portion 236 of the outer wall 232 is generally cylindrically-shaped. The second portion 238 of the outer wall 232 is generally hexagonally-shaped. The diameter of the second portion 238 is larger than the diameter of the first portion 236. The third portion 240 of the outer wall 232 is generally cylindrically-shaped. The diameter of the third portion 240 is larger than the diameter of the second portion 238. The first portion 236 extends from the proximal end of the shaft 226 to the second portion 238; the second portion 238 extends distally from the first portion 236 to the third portion 240; and the third portion 240 extends distally from the second portion 238 to the nose 228. A concave groove 242 is spaced from the proximal end of the adaptor 224 and is provided within the first portion 236 of the outer wall 232 to receive the steel balls 28. A tapered adaptor shoulder 244 is provided where the second portion 238 and the third portion 240 of the outer wall 232 meet.

The nose 228 of the adaptor 224 extends distally from the shaft 226. A thread 246 is provided on the outer wall of the nose 228 of the adaptor 224 for attachment of a hole saw as will be described herein.

Assembly of the arbor assembly 200 begins with assembly of the shank 20, sleeve 22, pilot drill bit 36, and set screw 26 as described with respect to the first embodiment.

The hole saw (not shown) is then mounted to the adaptor 224. The hole saw includes a circular shaped back plate with a skirt depending therefrom. An aperture is provided through the axial center in the back plate of the hole saw. A thread is provided on the wall of the aperture in the back plate of the hole saw which is engaged with the thread on the nose 228 of the adaptor 224.

The adaptor 224 is then mounted within the shank 20 and sleeve 22 by aligning the pilot drill bit 36 with the adaptor passageway 234. The adaptor 224 is moved proximally along the pilot drill bit 36 and within the adaptor passageway 234 until the adaptor shoulder 244 compresses the O-ring 32 within the shank shoulder 74.

The adaptor 224 is then locked with the shank 20 and sleeve 22 by sliding the sleeve 22 in the distal direction relative to the shank 20. The shank 20 and the sleeve 22 interact in the same manner as described above with respect to the first embodiment to force the balls 28 within the passageways 58 of the shank 20. As the balls 28 are forced within the ball passageways 58, the balls 28 contact the concave groove 242 of the adaptor 224. As a result of the contact between the balls 28 and the adaptor 224, the adaptor 224 is fixed axially within the shank 20. The arbor assembly 200 is shown in FIG. 8 in its locked position.

The arbor assembly 200 is used in the same manner as the arbor assembly 10. The hexagonally-shaped second section 72 of the adaptor portion 68 of the shank passageway 64 provides rotational force to the hexagonally shaped second portion 238 of the adaptor shaft 226, and in turn to the hole saw (not shown). Although the second section 72 of the adaptor portion 68 of the shank passageway 64 and the second portion 238 of the adaptor shaft 226 have been described as hexagonally-shaped, it is to be understood that the second section 72 and the second portion 238 could be of a variety of shapes so long as the second portion 238 of the adaptor shaft 226 fits within the second section 72 of the adaptor portion 68 of the shank passageway 64 and rotation of the adaptor 224 relative to the shank 20 is prevented.

If the user desires to use a different hole saw, perhaps one with a skirt with a different diameter, the user removes the adaptor 224 with the attached hole saw. The user slides the sleeve 22 in the proximal direction relative to the shank 20. As the sleeve 22 is pulled in the proximal direction, the locking protrusion 128 causes the C-ring 30 to compress. As the user continues to pull the sleeve 22 in the proximal direction the ball protrusion 120 of the sleeve 22 moves proximally of the ball passageways 58 of the shank 20 and the ball recess 138 of the sleeve 22 are aligned with the ball passageways 58. At this point the sleeve 22 is in the unlocked position and the balls 28 can move into the ball recesses 138 of the sleeve 22. As the balls 28 are no longer in engagement with the adaptor 224, the adaptor 224 can be removed from the shank 20 simply by pulling the adaptor 224 in the distal direction. As the adaptor 224 is pulled distally, the pilot drill 36 is stripped from the slug allowing the slug to be easily removed from the skirt 144 of the hole saw 34. A new hole saw mounted to another adaptor 224 can then be mounted within the shank 20 in the manner described above. Alternatively, the hole saw can be removed from the adaptor 224 and the new hole saw can be mounted to the adaptor 224 and then mounted within the shank 20.

A bushing 250 is shown in FIGS. 9a and 9b. The bushing 250 is used with the second embodiment of the arbor assembly 200. The bushing 250 is preferably made from metal, such as, steel and is used to provide additional support to hole saws with larger diameters but which are not so large as to include mounting screws.

The bushing 250 includes a hexagonally shaped flange 252 and a threaded nose 254. The flange 252 includes a proximal surface 252a and a distal surface 252b. The diameter of the nose 254 is smaller than the diameter of the flange 252. A cylindrically shaped bushing passageway 256 extends through the bushing 250 from its proximal end to its distal end. An outer thread 258 is provided on the outer surface of the nose 254 and an inner thread 260 is provided along the wall of the bushing passageway 256.

The bushing 250 is mounted to the adaptor 224 by passing the nose 228 of the adaptor 224 through the flange 252 of the bushing 250 and then engaging the thread 246 on the adaptor 224 with the inner thread 260 of the bushing 250. Mounting of the bushing 250 to the adaptor 224 is complete when the proximal surface 252a of the flange 252 contacts the distal end of the shaft 226 of the adaptor 224.

The hole saw is then mounted to the adaptor 224 and bushing 250 by passing the nose 254 of the bushing and the nose 228 of the adaptor 224 through the aperture in the back plate of the hole saw and threadedly engaging the aperture in the hole saw with the outer thread 258 of the bushing 250.

The adaptor 224 is then mounted within the shank 20 and the sleeve 22 and can be dismounted from the shank 20 and the sleeve 22 as described above with respect to the second embodiment of the arbor assembly 200.

While preferred embodiments of the present invention are shown and described, it is envisioned that those skilled in the art may devise various modifications of the present invention without departing from the spirit and scope of the attached claims.

The invention claimed is:

1. An arbor assembly for mounting a hole saw to a drill, the arbor assembly comprising:
   a shank for engagement with the drill, said shank including an O-ring recess;
   an adaptor for supporting the hole saw, said adaptor being mounted to said shank;
   an O-ring positioned within said O-ring recess, said O-ring reducing vibrations when the hole saw is rotated by the arbor assembly;
   means for locking said adaptor in engagement with said shank and for unlocking said adaptor from engagement with said shank; and
   said adaptor further includes a shoulder for engaging said O-ring.

2. An arbor assembly as defined in claim 1, wherein said shank includes a shank passageway and a portion of said adaptor is mounted within said shank passageway.

3. An arbor assembly as defined in claim 2, wherein a portion of said shank passageway includes flats and said adaptor includes flats on an exterior surface, wherein said flats on said portion of said shank passageway mate with said flats on said exterior surface of said adaptor.

4. An arbor assembly as defined in claim 2, wherein said means for locking includes at least one ball passageway in said shank and a ball groove in said adaptor, and wherein when said adaptor is positioned within said shank passageway, said at least one ball passageway is aligned with said ball groove.

5. An arbor assembly as defined in claim 4, wherein said means for locking further includes at least one locking ball positioned within said at least one ball passageway.

6. An arbor assembly as defined in claim 5, wherein said means for locking further includes a sleeve, a ball protrusion extending from an inner surface of said sleeve for moving said locking ball into engagement with said ball groove of said adaptor.

7. An adaptor assembly as defined in claim 1, further including a C-ring recess on an outer surface of said shank; a C-ring positioned therein; and said means for locking includes a sleeve, a locking protrusion extending from an inner surface of said sleeve, and wherein when said locking protrusion is positioned distally of said C-ring to lock said assembly and said locking protrusion is positioned proximally of said C-ring to unlock said assembly.

8. An arbor assembly as defined in claim 1, wherein said shank includes a set screw passageway and a set screw positioned within said set screw passageway.

9. An arbor assembly for mounting a hole saw to a drill, the arbor assembly comprising:
   a shank for engagement with the drill, said shank including a set screw passageway;
   a set screw positioned within said set screw passageway;
   an adapter for supporting the hole saw, said adapter being mounted to said shank; and
   means for locking said adapter in engagement with said shank and for unlocking said adapter from engagement with said shank, said means for locking including a sleeve, a set screw recess in said sleeve, said sleeve being maintained on said shank due to the engagement between said set screw and said set screw recess.

10. An arbor assembly for mounting a hole saw to a drill, the arbor assembly comprising:

a shank for engagement with the drill, said shank including a set screw passageway;

a set screw positioned within said set screw passageway;

an adapter for supporting the hole saw, said adapter being mounted to said shank; and means for locking said adapter in engagement with said shank and for unlocking said adapter from engagement with said shank, wherein said means for locking includes a sleeve having a set screw access passageway for providing access to said set screw.

11. An arbor assembly as defined in claim 1, wherein said adaptor includes a threaded nose for positioning within an aperture through a backplate of a hole saw.

12. An adaptor for use in connection with a quick assembly for mounting a hole saw to a drill, said adaptor comprising:

a shaft having a proximal end and a distal end, a pilot drill bit passageway through said shaft;

a flange extending outwardly from said shaft adjacent said distal end; and at least two apertures extending through said flange capable of receiving hole saw mounting screws; and a shoulder extending around a circumference of said shaft.

13. An arbor assembly as defined in claim 11, further including a bushing mounted to said nose of said adaptor.

14. An adaptor as defined in claim 12, wherein at least a portion of the outer surface of said shaft is hexagonally-shaped.

15. An adaptor as defined in claim 12, further including a ball groove extending around a circumference of said shaft.

16. An arbor assembly for mounting a hole saw to a drill, the arbor assembly comprising:

a shank for engagement with the drill, said shank including an O-ring recess;

an adaptor for supporting the hole saw, said adaptor being mounted to said shank, said adaptor includes a shaft having a proximal end and a distal end, a flange extending outwardly from said shaft adjacent said distal end, and at least two apertures through said flange capable of receiving hole saw mounting screws;

an O-ring positioned within said O-ring recess, said O-ring reducing vibrations when the hole saw is rotated by the arbor assembly;

means for locking said adaptor in engagement with said shank and for unlocking said adaptor from engagement with said shank; and said adaptor further includes a nose extending from said distal end of said shaft wherein the diameter of said nose is sized to extend through an aperture through the backplate of the hole saw.

17. An arbor assembly for mounting a hole saw to a drill, the arbor assembly comprising:

a shank for engagement with the drill;

an adaptor for supporting the hole saw, said adaptor slidably engaged with said shank, said adaptor further including a shaft having a proximal end and a distal end and a flange extending outwardly from said shaft adjacent said distal end, and at least two apertures provided through said flange for accepting fasteners extending through a backplate of the hole saw;

means for locking said adaptor in engagement with said shank and for unlocking said adaptor from engagement with said shank; and a nose extending from said distal end of said shaft wherein the diameter of said nose is sized to extend through an aperture through the backplate of the hole saw.

18. An adaptor for use in connection with a quick change assembly for mounting a hole saw to a drill, said adaptor comprising:

a shaft having a proximal end and distal end, a pilot drill bit passageway through said shaft;

a flange extending outwardly from said shaft adjacent distal end;

at least two aperture extending through said flange capable of receiving hole saw mounting screws; and a nose extending from said distal end of said shaft wherein the diameter of said nose is sized to extend through an aperture through the backplate of the hole saw.

19. An arbor assembly for mounting a hole saw to a drill, the arbor assembly comprising:

a shank for engagement with the drill;

a set screw mounted to said shank;

an adapter for supporting the hole saw, said adaptor slidably engaged with said shank;

a sleeve slidably engaged with said shank;

said set screw engaging said sleeve; and means associated with said sleeve for locking said adapter in engagement with said shank and for unlocking said adapter from engagement with said shank.

20. An assembly as defined in claim 9, wherein said assembly further includes a pilot drill bit maintained within said shank by said set screw.

21. An assembly as defined in claim 9, said means for locking further including at least one locking ball passageway through said shank and a locking ball, and wherein movement of said sleeve is limited by said set screw to maintain said locking ball at least partially within said locking ball passageway.

22. An arbor assembly as defined in claim 1, wherein said O-ring is compressed between said shoulder of said adaptor and said shank.

23. An arbor assembly as defined in claim 1, wherein said adaptor includes a shaft having a proximal end and a distal end, a flange extending outwardly from said shaft adjacent said distal end; and at least two apertures through said flange capable of receiving hole saw mounting screws.

* * * * *